F. M. LAWRENCE.
Grate.

No. 206,679.   Patented Aug. 6, 1878.

Witnesses.
Chas. H. Kimball.
Charles E. Clifford

Inventor.
Franklin M. Lawrence,
per Atty
Wm. Henry Clifford

UNITED STATES PATENT OFFICE.

FRANKLIN M. LAWRENCE, OF PORTLAND, MAINE.

IMPROVEMENT IN GRATES.

Specification forming part of Letters Patent No. 206,679, dated August 6, 1878; application filed January 2, 1878.

*To all whom it may concern:*

Be it known that I, FRANKLIN M. LAWRENCE, of Portland, in the county of Cumberland and State of Maine, have invented certain new and useful Improvements in Grates; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
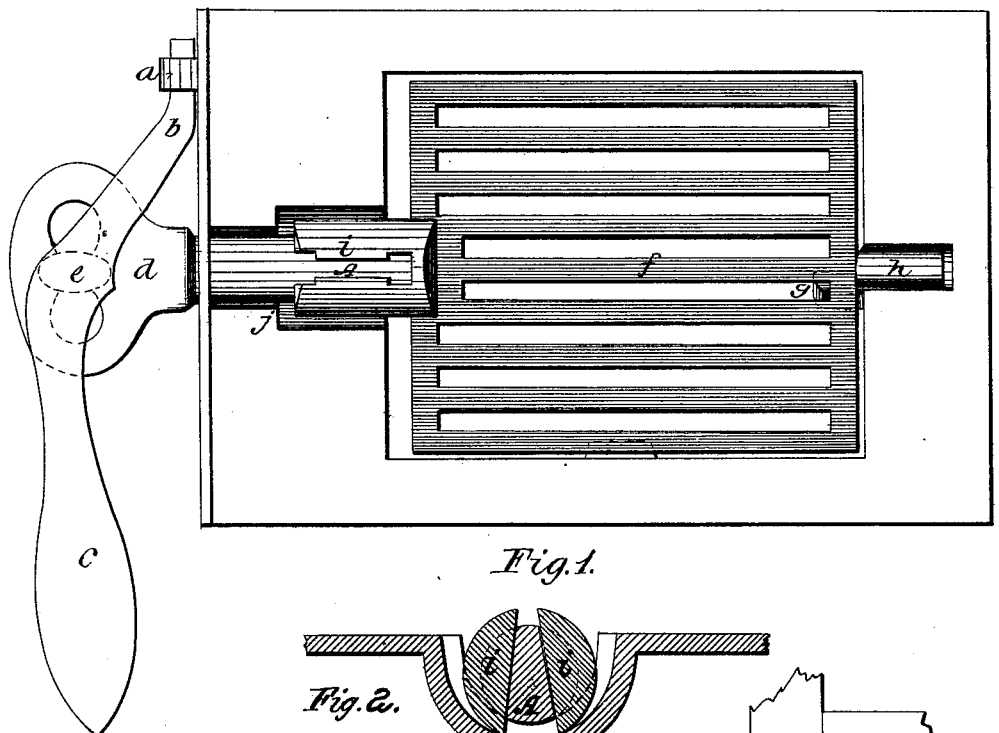
Figure 2:
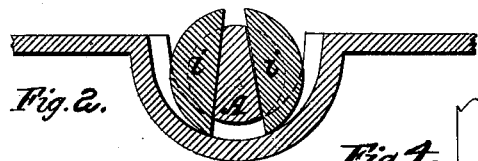
Figures 3, 4:
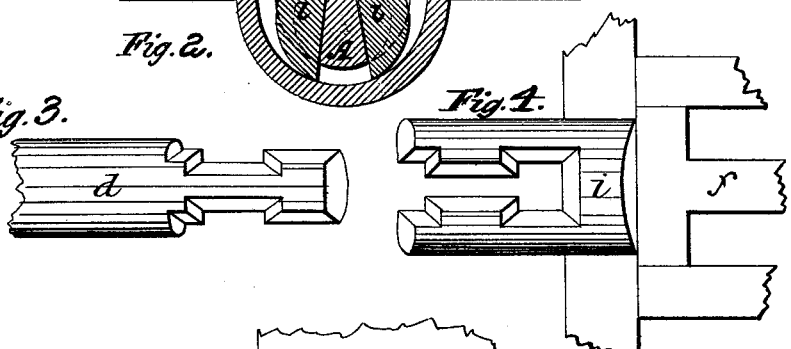
Figure 5:
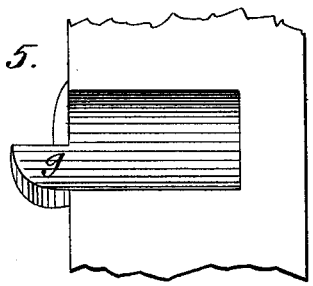

Figure 1 is a top view, showing the lever, the handle, and the socket-connection between the handle and grate. Fig. 2 is a vertical cross-section through the parts $i$ A of Fig. 1. Fig. 3 is a detailed view, showing the construction of the shank of the handle. Fig. 4 is a detail, showing the construction of the socket which receives the shank. Fig. 5 shows a start to prevent the grate from moving beyond a vertical position when tipped to remove the fuel therefrom.

The same letters show like parts.

My invention aims to produce certain improvements in grates applicable to furnaces, stoves, &c., and has for its particular objects to get a reliable socket-connection between the grate and the handle or lever used for shaking the grate, to obtain an improved leverage for shaking the grate, and to produce a device for controlling the extent of the motion of the grate when tipped up in order to be discharged of fuel.

$a$ is a hook on the outside of the stove, open on the under side thereof, and so located as to conveniently receive the end $b$ of the lever $c$ when employed, in connection with the handle $d$, to shake the grate. The lever $c$ has a projection, $e$, to enter an opening prepared for it in the handle $d$.

When the end $b$ is inserted in the hook $a$, and the projection $e$ in the opening of the handle, the grate $f$ can be easily and rapidly drawn inwardly and outwardly, so as to free it from ashes, cinders, &c. Furthermore, by tipping the lever $c$ so that the end $b$ will slip downwardly out of the open side of the hook $a$, the entire grate may be placed in a vertical position or up edgewise, so that all the fuel will fall therefrom into the ash-pit. The grate is prevented from being turned farther than up edgewise by the start $g$ on the frame, the grate striking the start and having its revolution thereby checked.

By the operation of the lever $c$, before described, the grate can be oscillated or drawn outwardly and inwardly, as specified above. This motion is controlled in the rear end of the grate by the pivot $h$ striking the end of the depression or bearing in which it rests. At the front it is regulated by the forward end of the socket-piece $i$ striking the shoulder $j$ of the concavity in the frame at that place.

The shank of the handle $d$ is, where it enters the socket, thicker at the bottom side than at the top, as indicated at A. The socket-piece $i$ has its socket of the same shape, so as to receive the end of the shank of the handle, which is introduced by an upward movement.

Fig. 3 shows in detail the construction of the shank of the handle, and Fig. 4 the socket to receive the shank. Those of the one fit into and match those of the other, so that drawing will not remove the handle from its socket. The handle is removed by slightly elevating the end of the grate, and thus slipping the shank out of the socket.

It is obvious that the handle and socket-connection herein described are equally applicable to grates having a lateral oscillation.

What I claim as my invention, and desire to secure by Letters Patent, is—

1. The combination of the handle $d$, having the end which enters the socket shaped as shown at A, with the socket-piece $i$ and the grate, the said handle and socket to operate as herein described.

2. The combination with the grate, as described, having the stop $g$, of the hook $a$, lever $c$, having projection $e$, and handle $d$, to operate as specified.

In testimony that I claim the foregoing as my own I affix my signature in presence of two witnesses.

FRANKLIN M. LAWRENCE.

Witnesses:
WM. HENRY CLIFFORD,
CHARLES E. CLIFFORD.